US011691752B2

(12) United States Patent
Hippe (10) Patent No.: US 11,691,752 B2
(45) Date of Patent: Jul. 4, 2023

(54) DUAL WALLED TUBE FLEXIBLE JOINT SEAL SYSTEMS AND METHODS

(71) Applicant: The Boeing Company, Chicago, IL (US)

(72) Inventor: Daniel A. Hippe, Seattle, WA (US)

(73) Assignee: The Boeing Company, Chicago, IL (US)

(*) Notice: Subject to any disclaimer, the term of this patent is extended or adjusted under 35 U.S.C. 154(b) by 775 days.

(21) Appl. No.: 16/601,760

(22) Filed: Oct. 15, 2019

(65) Prior Publication Data

US 2021/0107672 A1    Apr. 15, 2021

(51) Int. Cl.
| B64D 37/00 | (2006.01) |
| F16L 23/22 | (2006.01) |
| F16L 25/01 | (2006.01) |
| F16L 39/00 | (2006.01) |

(52) U.S. Cl.
CPC .......... *B64D 37/005* (2013.01); *F16L 23/22* (2013.01); *F16L 25/01* (2013.01); *F16L 39/005* (2013.01)

(58) Field of Classification Search
CPC ........ F16L 23/22; F16L 37/565; F16L 39/005
See application file for complete search history.

(56) References Cited

U.S. PATENT DOCUMENTS

| 4,293,150 A | | 10/1981 | Press | |
| 5,188,400 A | * | 2/1993 | Riley | F16L 23/06 |
| | | | | 24/270 |
| 6,848,720 B2 | * | 2/2005 | Carns | F16L 39/005 |
| | | | | 285/123.3 |
| 6,883,836 B2 | * | 4/2005 | Breay | F16L 25/01 |
| | | | | 285/145.4 |
| 6,971,682 B2 | * | 12/2005 | Hoang | F16L 37/565 |
| | | | | 285/123.3 |
| 7,458,543 B2 | | 12/2008 | Cutler et al. | |
| 7,717,473 B1 | * | 5/2010 | Zhang | F16L 39/04 |
| | | | | 285/302 |
| 8,172,272 B2 | * | 5/2012 | Petit | F16L 39/005 |
| | | | | 285/302 |
| 8,480,133 B2 | * | 7/2013 | Zhang | F16L 27/026 |
| | | | | 285/302 |
| 9,360,144 B2 | * | 6/2016 | Carns | F16L 25/01 |
| 9,618,148 B2 | * | 4/2017 | Breay | B64D 37/32 |
| 9,982,821 B1 | * | 5/2018 | Scheiferstein | F16L 21/035 |
| 10,552,552 B2 | * | 2/2020 | Lawson | G06F 30/13 |
| 11,181,219 B2 | * | 11/2021 | Eitzenberger | F16L 39/005 |
| 2009/0102187 A1 | * | 4/2009 | Carns | F16L 25/01 |
| | | | | 285/123.15 |

* cited by examiner

*Primary Examiner* — Zachary T Dragicevich
*Assistant Examiner* — Alexander T Rufrano
(74) *Attorney, Agent, or Firm* — Kwan & Olynick LLP (57) ABSTRACT

Systems and methods for a segmented aircraft refueling tube with a tube interface include a plurality of seals configured to deform while allowing relative movement between tube segments. The systems include a tube interface that includes a first ring, a second ring, a first seal disposed between a first ferrule and the first ring, a second seal disposed between a second ferrule and the second ring, a third seal disposed between the first ring and a sleeve, and a fourth seal disposed between the second ring and the sleeve. The plurality of seals per ring allow for misalignment between the ferrules to be accommodated by two or more seals.

22 Claims, 8 Drawing Sheets

DUAL WALLED TUBE FLEXIBLE JOINT SEAL SYSTEMS AND METHODS

This invention was made with Government support under contract number FA8625-11-C-6600 awarded by the Department of Defense. The Government has certain rights in this invention.

BACKGROUND

Refueling tubes, especially in an aircraft application, are made of a plurality of different tube sections that are joined together. The different tube sections are rarely held in a precise straight alignment. Thus, the centerline of adjoining tube sections are often skewed and/or offset relative to one another. Typically, the tube sections are coupled to flanges or other types of rigid end fittings.

Existing solutions include large gaps between the fittings of adjoining tube sections to allow for relative movement between the adjoining tube sections. Joints are used to couple the sections together. To accommodate the large gaps, lip type seals are used as seals in the joints to prevent leakage when tube sections are not in precise alignment. However, these types of seals are very difficult to install and have difficulty creating or maintaining a seal at low system pressures as, to accommodate the large amount of possible relative movement, such seals must be installed with little or no preload. Thus, improved sealing systems and techniques are desirable.

SUMMARY

Described are methods and systems for tube interfaces for joining together tube segments and/or ferrules coupled to the tube segments. Systems described herein allow for misalignment between tube segments to be borne by deflection of a plurality of seals. Each individual seal is, thus, subjected to lower amounts of deformation. As the deformation requirements of seals are lower, easier to install seals such as O-rings are used. Additionally, the tube interfaces described herein are, in certain examples, used to join together multi-walled ferrules that include a plurality of flow channels.

Illustrative, non-exclusive examples of inventive features according to present disclosure are described herein. These and other examples are described further below with reference to figures.

BRIEF DESCRIPTION OF THE DRAWINGS

The disclosure may best be understood by reference to the following description taken in conjunction with the accompanying drawings, which illustrate various examples.

DETAILED DESCRIPTION

In the following description, numerous specific details are set forth in order to provide a thorough understanding of the presented concepts. The presented concepts may be practiced without some, or all, of these specific details. In other instances, well known process operations have not been described in detail to avoid unnecessarily obscuring the described concepts. While some concepts will be described with the specific examples, it will be understood that these examples are not intended to be limiting.

INTRODUCTION

Segmented tubes that include a plurality of tube sections, such as tubes for in-flight aircraft refueling, are connected by joints. The joints need to seal the connection point at the segments to prevent leakage while allowing for relative movement between neighboring sections. Typically, the sections can move a large amount relative to one another. However, accommodating such large movements require seals that compress and extend large distances. As such seals have a large range of movement and typically need to be installed with a large amount of preload, installation of such seals is challenging. Furthermore, the range of movement of the tube sections can be challenging to seal with even seals of the largest amount of possible movement ranges.

Figure 1:
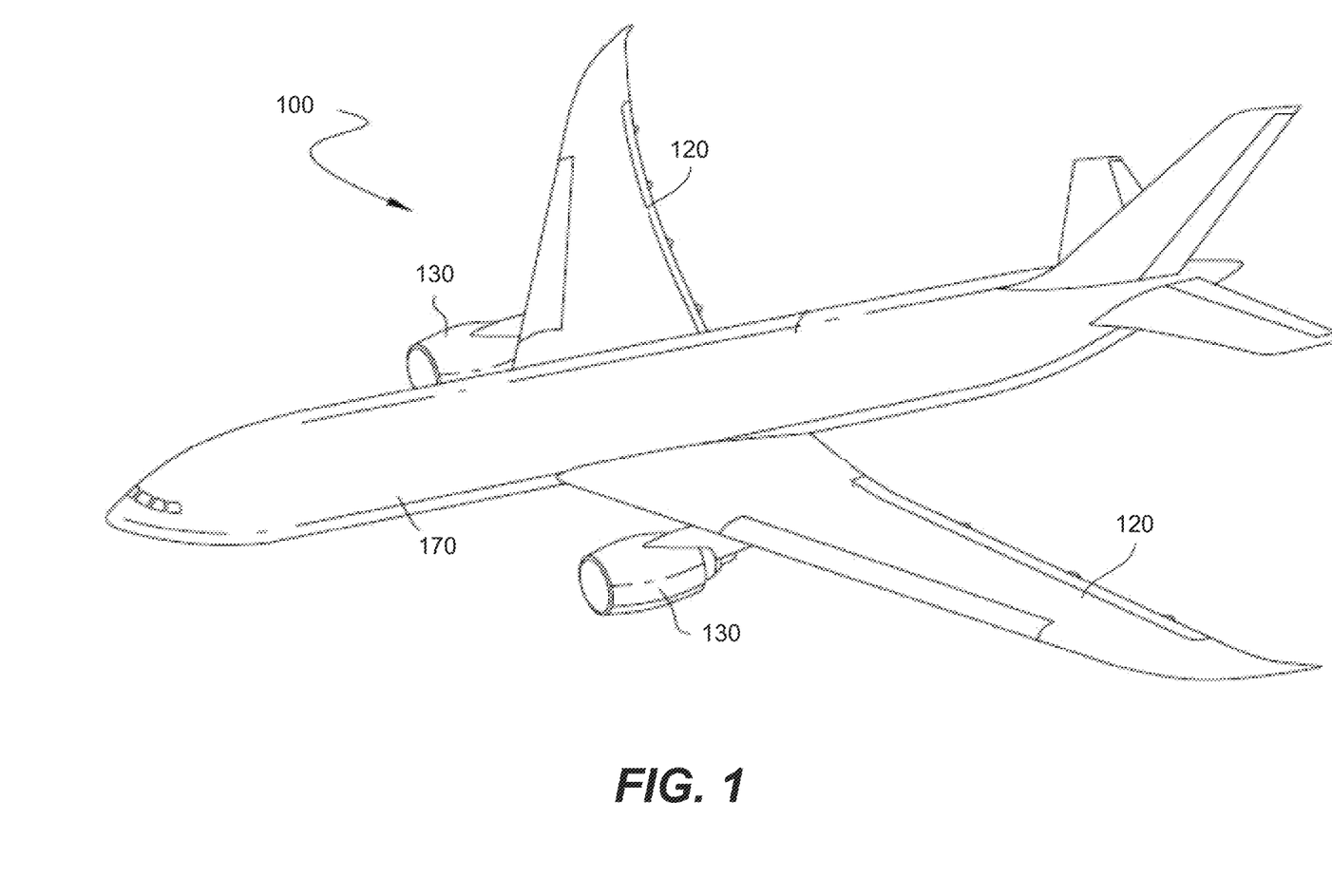
FIG. 1 illustrates a vehicle with a refueling structure, in accordance with some examples.

An example of a vehicle with such a segmented tube is shown in FIG. 1. FIG. 1 illustrates a vehicle with a refueling structure, in accordance with some examples. FIG. 1 illustrates vehicle 100 that can be a fixed wing aircraft, but other examples can include other structures (e.g., automotive tankers, building based refueling structures, and other such refueling structures).

Vehicle 100 includes fuselage 170, wings 120, and aircraft propulsors 130. Vehicle 100 of FIG. 1 includes one or more tubes for transfer of fluid between various components of vehicle 100. Thus, for example, vehicle 100 includes tubes that allow for fuel to be communicated from a fuel tank to a propulsor, that allow for vehicle 100 to be refueled and/or refuel other vehicles in operation (e.g., as an aerial tanker), that allow for other fluids such as coolants and lubricants to be communicated between various components of vehicle 100, and/or other such tubes. The tubes described herein are, in certain examples, segmented tubes that include a plurality of tube sections coupled together with joints that allow relative movement between the tubes. While vehicle 100 described herein is an aircraft, it is appreciated that, in other examples, the systems and techniques described herein are utilized or performed by vehicles or other fluid carrying tubes (e.g., such as the tubes of refueling stations).

Examples of Segmented Tubes

Figure 2A:
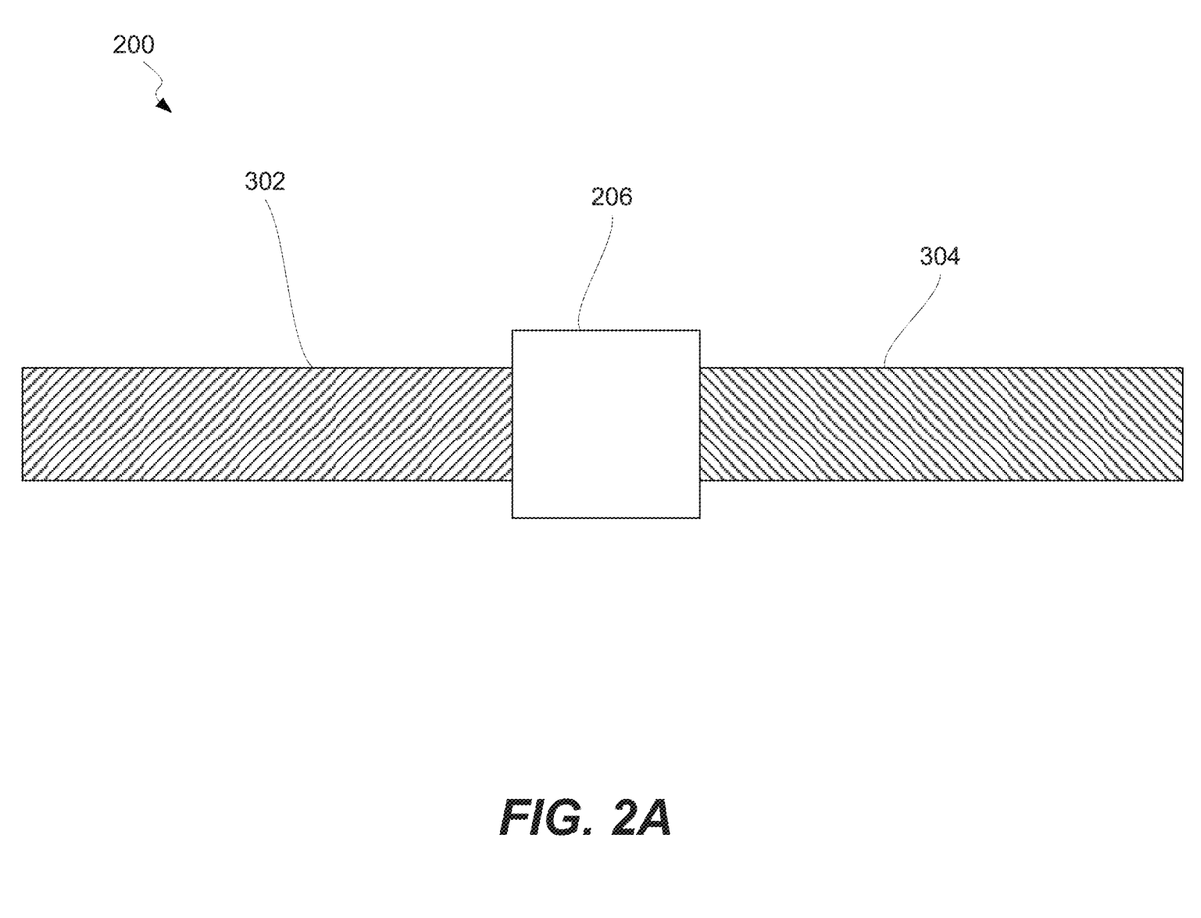
FIGS. 2A and 2B illustrate side representations of a portion of a segmented tube, in different positions, in accordance with some examples.
Figure 2B:
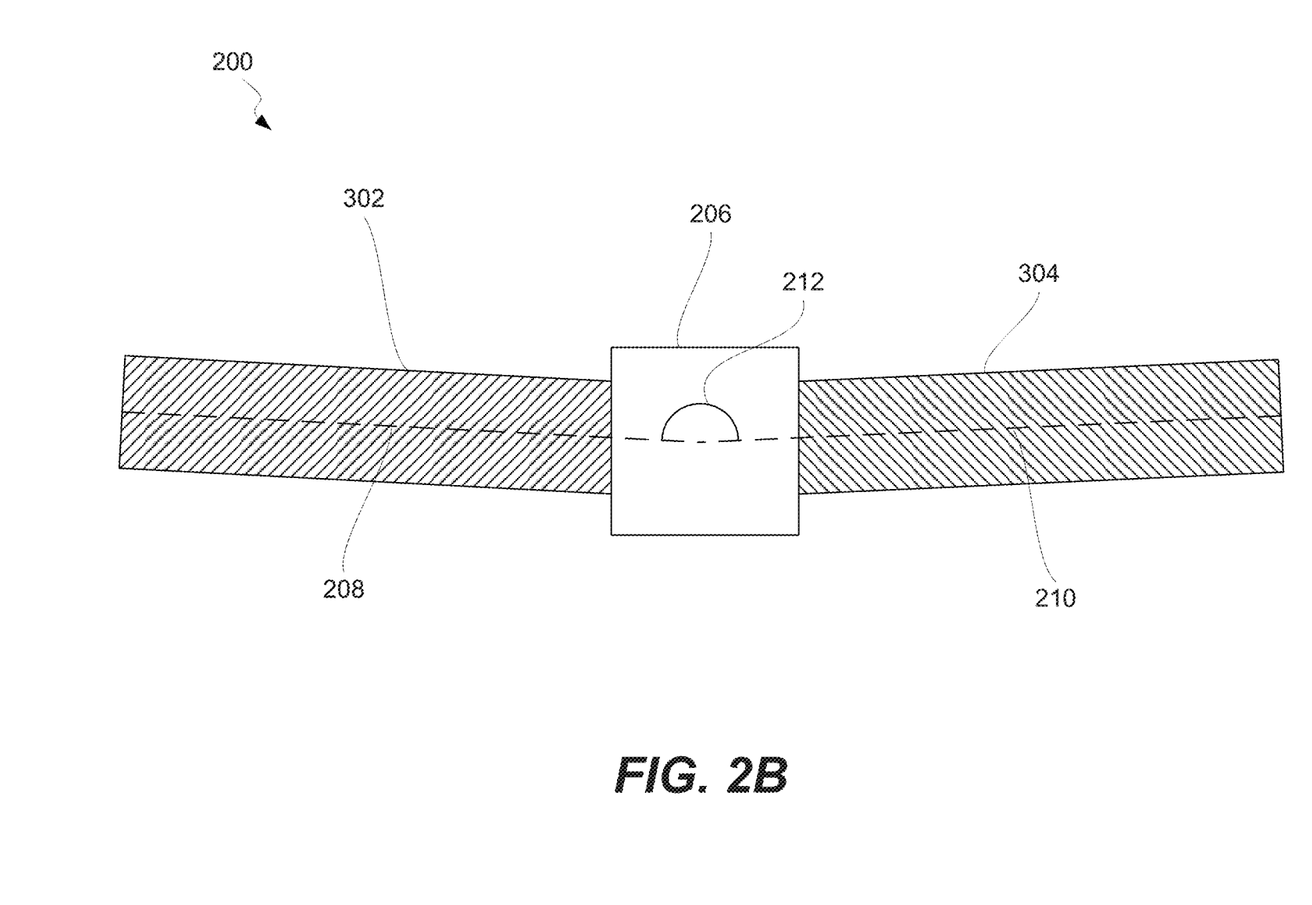

FIGS. 2A and 2B illustrate side representations of a portion of a segmented tube, in different positions, in accordance with some examples. FIGS. 2A and 2B illustrate aircraft refueling tube 200 that includes first refueling tube 302, second refueling tube 304, and tube interface 206 coupling together first refueling tube 302 and second refueling tube 304. While the examples described herein are directed to refueling tubes, it is appreciated that the systems and techniques described herein can be applied to other tubes and segmented fluid carrying items.

As shown in FIGS. 2A and 2B, tube interface 206 couples together first refueling tube 302 and second refueling tube 304. In FIG. 2A, first refueling tube 302 and second refueling tube 304 are in a static position where they are perfectly aligned. However, in various examples, tube interface 206 allows for first refueling tube 302 to move relative to second refueling tube 304 as, during operation, first refueling tube 302 and second refueling tube 304 will often not be perfectly aligned with each other.

Such an example is shown in FIG. 2B. FIG. 2B shows first refueling tube 302 with first centerline 208 and second refueling tube 304 with second centerline 210. In FIG. 2B, first centerline 208 of first refueling tube 302 is disposed at angle 212 to second centerline 210 of second refueling tube 304. In certain examples, angle 212 is a threshold angle or maximum angle of misalignment between first refueling tube 302 and second refueling tube 304 (and their respective ferrules).

Other examples include translational offsets between first centerline 208 and second centerline 210 (e.g., offsets where the centerlines do not meet at a point as shown in FIG. 2B). In various examples, misalignment between first refueling tube 302 and second refueling tube 304 includes angular offsets, translational offsets, or both. Tube interface 206 allows for sealing of one or more flow channels within the refueling tubes while first refueling tube 302 is offset from second refueling tube 304. As such, tube interface 206 includes seals and other features to prevent leakage of fluid within the flow channel.

Figure 3:
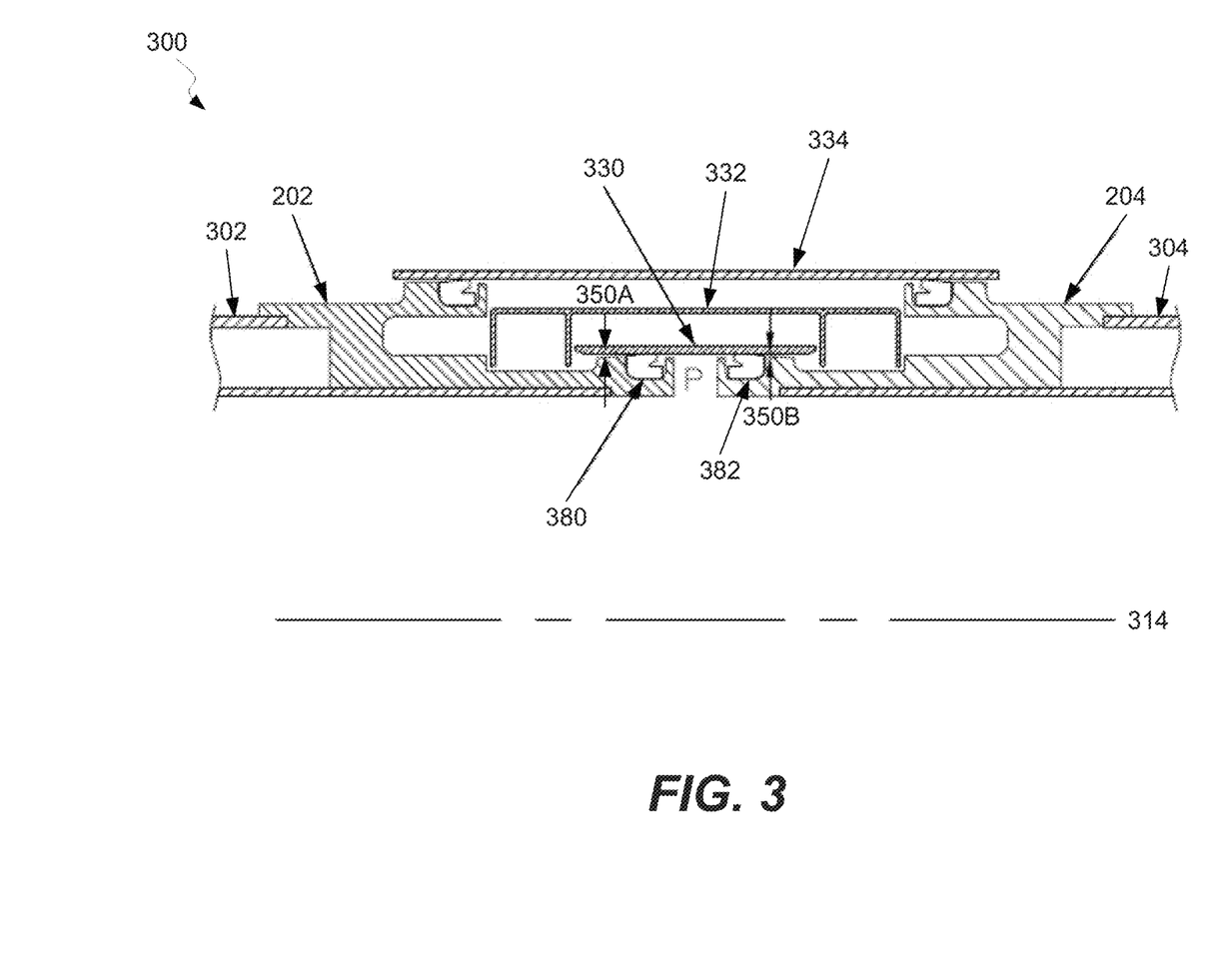
FIG. 3 illustrates a side cutaway representation of a segmented tube, in accordance with some examples.
Figure 4A:
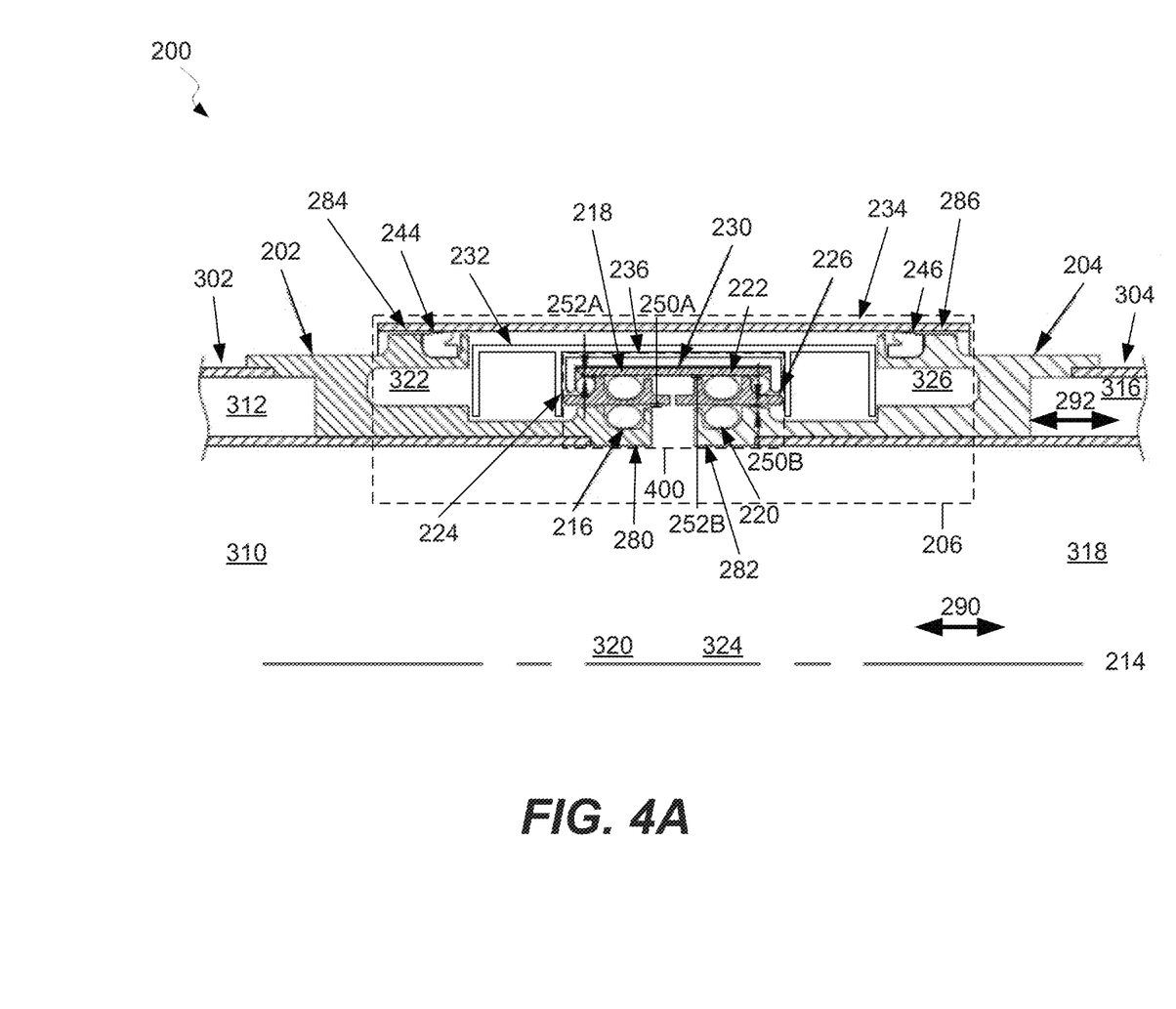
FIG. 4A illustrates a side cutaway representation of a segmented tube with a dual walled multi-seal tube interface joint, in accordance with some examples.
Figure 4B:
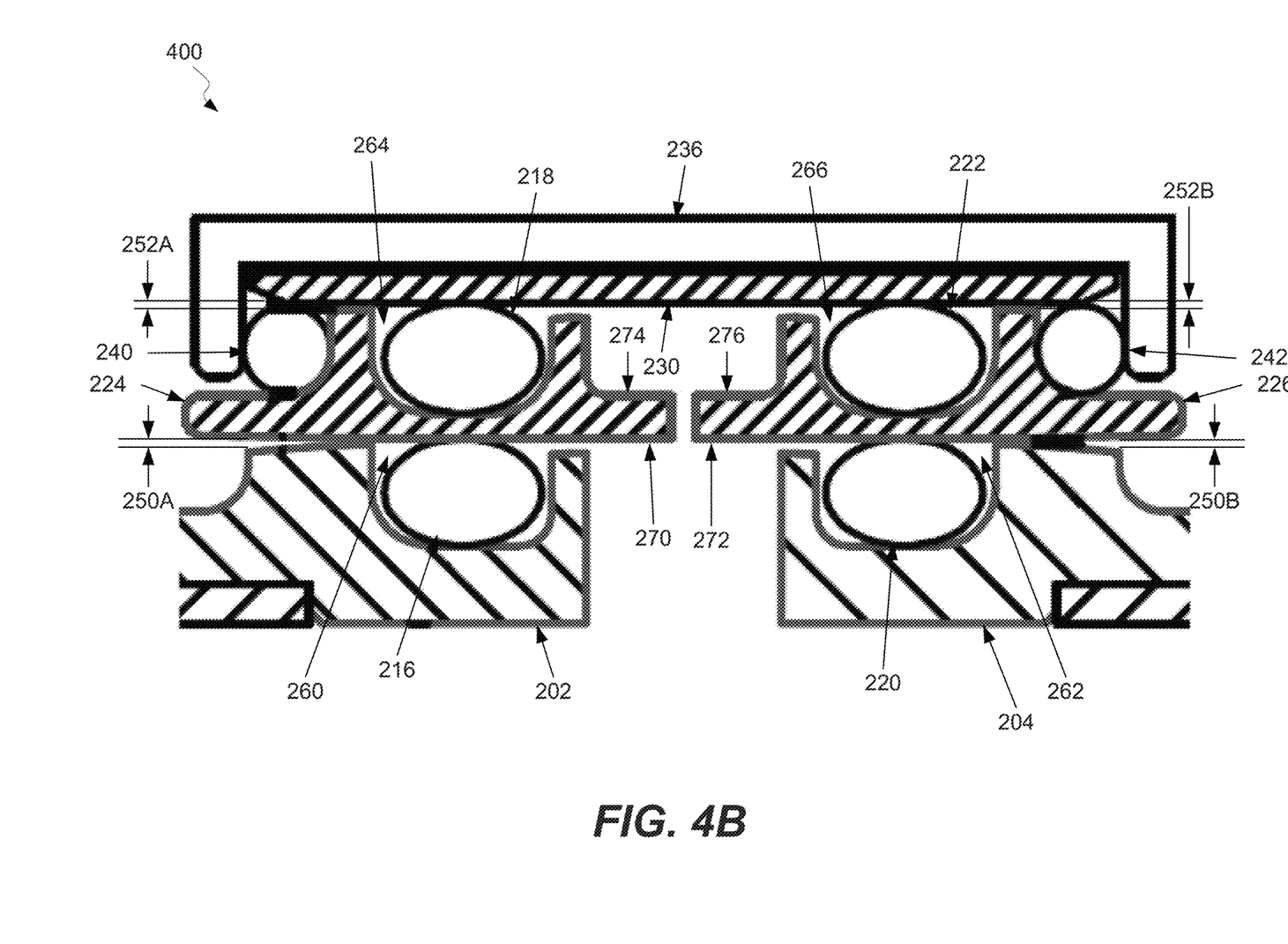
FIG. 4B illustrates a detailed side cutaway representation of section 400 of FIG. 4A, in accordance with some examples.

Various elements of tube interface 206 and how they interface with first refueling tube 302 and second refueling tube 304 are described herein. FIGS. 3 and 4 are cross-sectional illustrations. The examples shown in FIGS. 3 and 4 are cylindrical. Thus, FIGS. 3 and 4 include centerlines 314 and 214, respectively. The features shown in FIGS. 3 and 4 are mirrored across centerlines 314 and 214. Such mirrored features are not shown.

Example of Tube Interface

FIG. 3 illustrates a side cutaway representation of a segmented tube, in accordance with some examples. FIG. 3 illustrates segmented tube 300 that includes first refueling tube 302, second refueling tube 304, first ferrule 202 coupled to first refueling tube 302, second ferrule 204 coupled to second refueling tube 304, sleeve 330 coupled to first ferrule 202 and second ferrule 204, and lip seals 380 and 382 coupled to and configured to seal sleeve 330 and first ferrule 202 and second ferrule 204. Sleeve 330 is secured to first ferrule 202 and second ferrule 204 with clip 332.

As shown, to accommodate relative movement between first refueling tube 302 and second refueling tube 304 and, thus, first ferrule 202 and second ferrule 204, sleeve 330 includes an inner radius that is larger than the outer radius of the portion of first ferrule 202 and second ferrule 204 that it is disposed around. The difference in radius results in gaps 350A and 350B between sleeve 330 and each of first ferrule 202 and second ferrule 204, respectively. Lip seals 380 and 382 are accordingly disposed in grooves of first ferrule 202 and second ferrule 204, respectively, and contact sleeve 330 to seal gaps 350A and 350B, respectively, and prevent leakage of fluid through gaps 350A and 350B. Thus, the larger inner radius of sleeve 330 in combination with lip seals 380 and 382 allow for relative movement between first refueling tube 302 and second refueling tube 304 and, thus, first ferrule 202 and second ferrule 204, while preventing fluid leaks.

In the example of FIG. 3, lip seals are used instead of other types of seals as lip seals are able to accommodate larger gaps without leaking. However, lip seals are difficult to install. Furthermore, using a single lip seal per ferrule to accommodate the full range of possible motions between first refueling tube 302 and second refueling tube 304 results in lip seals 380 and/or 382 having little or no preload when first refueling tube 302 and second refueling tube 304 are disposed relative to each other in certain positions (e.g., at the edge of their possible positions).

Segmented tube 300 further includes an outer cover 334. Outer cover 334 is a secondary cover that, in certain examples, is a backup seal. Outer cover 334 includes or is coupled to additional seals (e.g., lip seals) to further seal to first ferrule 202 and second ferrule 204.

Examples of Multi-Seal Tube Interface Features

FIG. 4A illustrates a side cutaway representation of a segmented tube with a dual walled multi-seal tube interface joint, in accordance with some examples. FIG. 4B illustrates a detailed side cutaway representation of section 400 of FIG. 4A, in accordance with some examples. FIG. 4A illustrates segmented tube 200 that includes first refueling tube 302, second refueling tube 304, first ferrule 202 coupled to first refueling tube 302, second ferrule 204 coupled to second refueling tube 304, tube interface 206, and an outer cover 234. FIG. 4B is a blown up view of section 400 of FIG. 4A to more clearly show features of tube interface 206. The features of the examples of FIGS. 4A and 4B are described together herein.

First ferrule 202 is coupled to first refueling tube 302 and second ferrule 204 is coupled to second refueling tube 304. In various examples, the ferrules are coupled to the refueling tubes through swaging, welding, bonding, and other techniques. Coupling the ferrules to the refueling tubes allow for the forming of flexible conduits.

In various examples, such flexible conduits are doubled walled to form flexible double walled tube connections. Thus, the refueling tubes and ferrules are both double walled in such examples. Accordingly, a plurality of flow channels for fluids are present in such double walled tube connections. In a certain example, first fluid 290 flows within a first flow channel that includes, at least, first inner flow channel 310 of first refueling tube 302, first ferrule channel 320 of first ferrule 202, third ferrule channel 324 of second ferrule 204, and second inner flow channel 318 of second refueling tube 304. Second fluid 292 flows within a second flow channel that includes, at least, first outer flow channel 312 of first refueling tube 302, second ferrule channel 322 of first ferrule 202, fourth ferrule channel 326 of second ferrule 204, and second outer flow channel 316 of second refueling tube 304.

In various examples, first fluid 290 and second fluid 292 are different liquid or gaseous fluids. For example, in a certain example, first fluid 290 is fuel and second fluid 292 is air (e.g., the second flow channel is an empty channel configured as a backup channel to prevent leakage of fuel). In another example, first fluid 290 is fuel and second fluid 292 is coolant. Thus, first fluid 290 and second fluid 292 are, in various examples, any type of liquid and/or gaseous fluids.

Additional details of dual channel flexible conduits is included in U.S. patent application Ser. No. 15/946,502, entitled "Flexible Double Walled Tube Connection" and filed Apr. 5, 2018, the contents of which are incorporated by reference herein.

First ferrule 202 includes first ferrule first portion 280 that includes first groove 260. First groove 260 receives first seal 216 of tube interface 206. First ferrule 202 additionally includes first ferrule second portion 284. Second ferrule 204 includes second ferrule first portion 282 that includes second groove 262 that receives third seal 220 of tube interface 206. Second ferrule 204 also includes a second ferrule second portion 286.

In certain examples, first portions 280 and 282 are smaller in radius than second portions 284 and 286, respectively. Thus, tube interface 206 is coupled to first portions 280 and 282 to couple together first ferrule 202 and second ferrule 204 as well as prevent leakage from any misalignment between first ferrule 202 and second ferrule 204. Outer cover 234 is coupled to second portions 284 and 286 and is disposed over at least a portion of tube interface 206.

Tube interface 206 couples together first ferrule 202 and second ferrule 204 and allows for relative movement between the ferrules without leakage. Tube interface 206 includes first ring 224, second ring 226, sleeve 230, and a plurality of seals. In various examples, first ring 224, second ring 226, and sleeve 230 are cylindrical or partially cylindrical in shape and are configured to be disposed over first ferrule 202 and/or second ferrule 204.

First ring 224 includes first ring first surface 270 disposed on a bottom portion of first ring 224 and first ring second surface 274 disposed on an upper portion of first ring 224. Second ring 226 includes second ring first surface 272 disposed on a bottom portion of second ring 226 and second ring second surface 276 disposed on an upper portion of second ring 226. In a certain example, first ring 224 and second ring 226 are different rings that do not directly contact each other. Instead, first ring 224 and second ring 226 are coupled via seals 218 and 222 and sleeve 230. Such a configuration forms a joint structure that allows for greater misalignment between first ferrule 202 and second ferrule 204.

First seal 216 is coupled to first ring first surface 270 and first ferrule 202. Second seal 218 is coupled to first ring second surface 274 and sleeve 230. Third seal 220 is coupled to second ring first surface 272 and second ferrule 204. Fourth seal 222 is coupled to second ring second surface 276 and sleeve 230.

First ring 224 and second ring 226 include inner radii that are larger than the outer radii of the first ferrule first portion 280 and the outer radii of second ferrule first portion 282, respectively, that rings 224 and 226 are disposed around. Sleeve 230 includes an inner radius that is larger than the outer radii of first ring 224 and second ring 226 that sleeve 230 is disposed around. The difference between the outer radius of a first portion and the inner radius of one of first ring 224 or second ring 226 results in gap 250A or 250B, respectively, between the respective ring and the respective ferrule. The difference in the inner radius of sleeve 230 and the outer radius of first ring 224 or the outer radius of second ring 226 results in gap 252A or 252B, respectively between sleeve 230 and the respective one of first ring 224 and second ring 226. In certain examples, gaps on either side of seals 216, 218, 220, and 222, respectively, are different from each other due to compression of seals 216, 218, 220, and 222, respectively, and/or geometry of rings 224 and/or 226.

The sum of gaps 250A and 252A and sum of gaps 250B and 252B equals that of gaps 350A and 350B, respectively, of the example of FIG. 3. Thus, in the examples of FIGS. 4A and 4B, the distance of gap 350A is accordingly spread between two gaps, that of gaps 250A and 252A. A change in gap 250A is thus accommodated by seals 216 and 220 while a change in gap 252A is accommodated by seals 218 and 222. As such, instead of a single seal per ferrule (e.g., lip seal 380 or 382) configured to deform to accommodate all the misalignment (e.g., angular or translational misalignment), tube interface 206 includes a plurality of seals, per side, the combined deformation of which accommodates the misalignment.

As the total deformation is spread over a plurality of seals, each seal would be required to deform less than if the total deformation is imparted to a single seal. Thus, in a certain example, seals 216-222 are seals that are able to deform a lesser amount, such as oval or round O-rings, instead of lip seals. Such seals are easier to install than lip seals and, thus, the examples of FIGS. 4A and 4B are easier to assemble than the example of FIG. 3. Furthermore, as a plurality of seals are used to accommodate misalignment, tube interface 206 is configured such that the preload is maintained on seals 216-222 at the limits of misalignment, allowing for improved sealing at low system pressures. Also, in certain examples, system pressure of segmented tube 200 is higher than that of segmented tube 300 due to the smaller extrusion gaps. In certain other examples, tube interfaces include additional seals (e.g., more than seals 216-222) and rings (e.g., more than rings 224 and 226) to accommodate greater amounts of misalignment or to spread misalignment over a greater number of seals and, thus, decrease the amount of deformation of each individual seal.

In certain examples, each of seals 216-222 are disposed within one or more grooves to hold seals 216-222 in an intended position during operation. Thus, for example, first ferrule 202 includes first groove 260 and second ferrule 204 includes second groove 262. First seal 216 is disposed within first groove 260 and third seal 220 is disposed within the second groove 262. Additionally, first ring 224 includes third groove 264 and second ring 226 includes fourth groove 266. Second seal 218 is disposed within third groove 264 and fourth seal 222 is disposed within fourth groove 266.

Collar 236 is disposed over sleeve 230. Collar 236 includes a first portion, a second portion, and a third portion. The second portion and the third portion are disposed at an angle to the first portion. Accordingly, collar 236 forms an upside down "U" shape in cross-section. In certain examples, collar 236 and sleeve 230 are integrated as a unified component.

In certain examples, first side seal 240 is disposed on a side portion of first ring 224 and second side seal 242 is disposed on a side portion of second ring 226. First side seal 240 is disposed between first ring 224 and the second portion of collar 236 while second side seal 242 is disposed between second ring 226 and the third portion of collar 236. First side seal 240 and second side seal 242 thus prevents forward and backward (relative to the views shown in FIGS. 4A and 4B) movement of first ring 224 and second ring 226 and, accordingly, can react and counter hydraulic force exerted on tube interface 206 from first fluid 290 by more evenly distributing this force to the second and third portions of collar 236.

Clip 232 is disposed over collar 236. Clip 232 secures tube interface 206 to first ferrule 202 and second ferrule 204 and prevents tube interface 206 from decoupling from first ferrule 202 and second ferrule 204. In certain examples, clip 232 is a circular or semi-circular clip configured to be disposed over at least a portion of, for example, collar 236 or sleeve 230.

Figure 5:
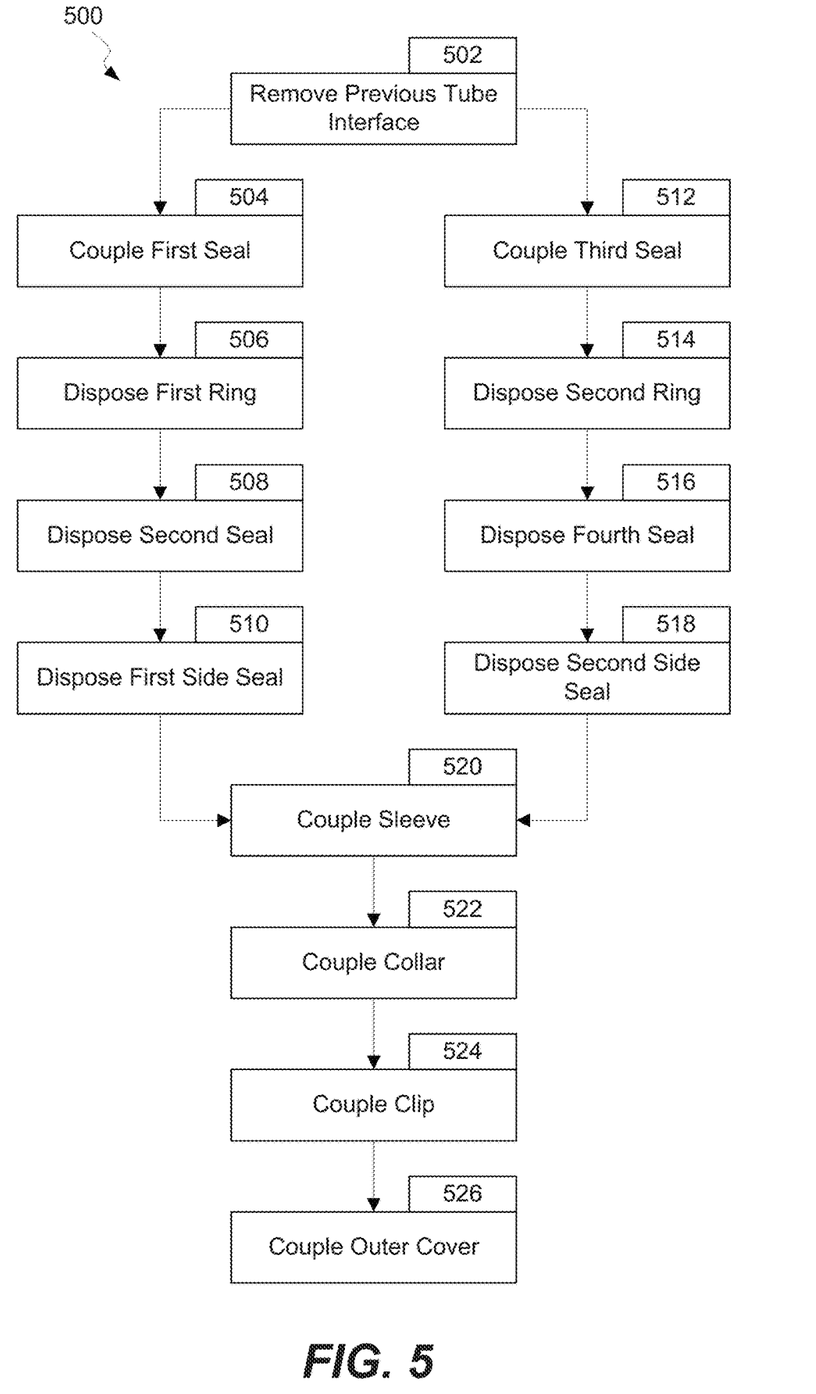
FIG. 5 illustrates a flow chart of assembling a tube with a dual walled tube interface joint, in accordance with some examples.

Segmented tube 200 further includes outer cover 234. Outer cover 234 is coupled to first ferrule second portion 284 and second ferrule second portion 286. Outer cover 234 is an additional cover that seals the second fluid channel that contains second fluid 292 and is disposed over tube interface 206. Outer cover 234 is sealed to first ferrule 202 and second ferrule 204 through first outer seal 244 and second outer seal 246, respectively. Outer seals 244 and 246 are disposed within grooves of first ferrule 202 and second ferrule 204, respectively. Outer cover 234 is a cylindrical cover that covers first ferrule 202 and second ferrule 204, Technique for Retrofitting Tube Interface Tube interface 206 is retrofittable onto existing segmented tubes. Thus, technique 500 allows for retrofitting of existing segmented tubes with tube interface 206.

In step 502, a previous tube interface is removed from a segmented tube. Thus, for example, the interface shown in FIG. 3 is removed in step 502. Steps 504-510 are directed to coupling first ring 224 and associated seals 216 and 218 to first ferrule 202. Steps 512-518 are directed to coupling second ring 226 and associated seals 220 and 222 to second ferrule 204.

Thus, in step 504, first seal 216 is coupled to first ferrule 202 by being disposed within first groove 260. In step 506, first ring 224 is coupled to and disposed over first seal 216. First ring first surface 270 contacts first seal 216. In step 508, second seal 218 is then coupled to first ring 224 by being disposed within third groove 264 of first ring second surface 274. First side seal 240 is disposed on a side portion of first ring 224 in step 510.

In step 512, third seal 220 is coupled to second ferrule 204 by being disposed within second groove 262. In step 514, second ring 226 is coupled to and disposed over third seal 220. Second ring first surface 272 then accordingly contacts third seal 220. In step 516, fourth seal 222 is then coupled to second ring 226 by being disposed within fourth groove 266 of second ring second surface 276. Second side seal 242 is then disposed on a side portion of second ring 226 in step 518.

In step 520 sleeve 230 is coupled to second seal 218 and fourth seal 222. In various examples, sleeve 230 is disposed over second seal 218 and fourth seal 222. In certain examples, sleeve 230 preloads seals 216-222 and, thus, aids in sealing the first channel from leaking first fluid 290.

In step 522, collar 236 is disposed over sleeve 230. In step 524, clip 232 is disposed over collar 236 to hold tube interface 206 to the first portions of first ferrule 202 and second ferrule 204. Outer cover 234 is then disposed over the second portions of first ferrule 202 and second ferrule 204 in step 526. In certain examples, outer seals 244 and 246 are coupled to first ferrule 202 and second ferrule 204, respectively, when disposing outer cover 234 over the second portions of first ferrule 202 and second ferrule 204.

Vehicle Examples

While the systems, apparatus, and methods disclosed above have been described with reference to airplanes and the aerospace industry, it will be appreciated that the examples disclosed herein is applicable to other contexts as well, such as automotive, railroad, and other mechanical and vehicular contexts. Accordingly, examples of the disclosure is described in the context of an airplane manufacturing and service method 600 as shown in FIG. 6A and vehicle 100 as shown in FIG. 6B in applicable to such other contexts.

Figure 6A:
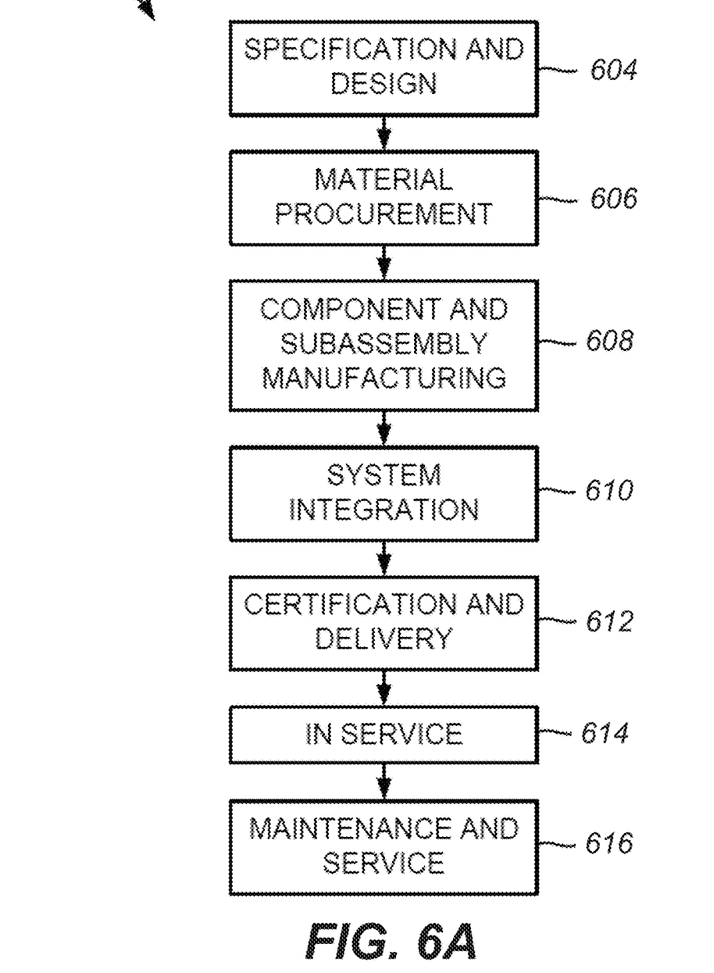
FIG. 6A illustrates a flow chart of an example of an aircraft production and service methodology, in accordance with some examples.

FIG. 6A illustrates a flow chart of an example of a vehicle production and service methodology, in accordance with some examples. In some examples, during pre-production, method 600 includes the specification and design 604 of vehicle 100 (e.g., an aircraft as shown in FIG. 1) and material procurement 606. During production, component and subassembly manufacturing 608 and system integration 610 of vehicle 100 takes place. Thereafter, vehicle 100 goes through certification and delivery 612 in order to be placed in service 614. While in service by a customer, the vehicle 100 is scheduled for routine maintenance and service 616 (e.g., modification, reconfiguration, refurbishment, and so on).

In certain examples, each of the processes of method 600 is performed or carried out by a system integrator, a third party, and/or an operator (e.g., a customer). For the purposes of this description, a system integrator includes any number of airplane manufacturers and major-system subcontractors; a third party includes any number of venders, subcontractors, and suppliers; and an operator can be an airline, leasing company, military entity, service organization, and so on.

Figure 6B:
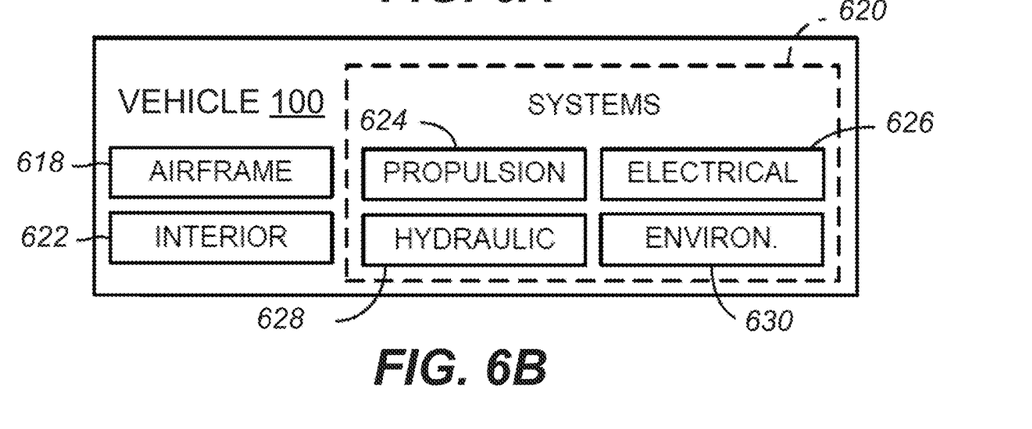
FIG. 6B illustrates a block diagram of an example of a vehicle, in accordance with some examples.

FIG. 6B illustrates a block diagram of an example of a vehicle, in accordance with some examples. As shown in FIG. 6B, the vehicle 100 (e.g., an aircraft) produced by method 600 includes airframe 618 with plurality of systems 620, and interior 622. Examples of systems 620 include one or more of propulsion system 624, electrical system 626, hydraulic system 628, and environmental system 630. In various examples, other systems are also included within vehicle 100. Although an aerospace example is shown, the principles of the embodiments disclosed herein is applicable to other industries, such as the automotive industry.

Further Examples

Further, the disclosure includes examples according to the following clauses:

Clause 1. Aircraft refueling tube system 200 comprising:
first refueling tube 302;
second refueling tube 304;
first ferrule 202 coupled to first refueling tube 302;
second ferrule 204 coupled to second refueling tube 304; and
tube interface 206 comprising:
first seal 216 coupled to first ferrule 202;
first ring 224 comprising first ring first surface 270 and first ring second surface 274, wherein first seal 216 is coupled to first ring 224 on first ring first surface 270;
second seal 218 coupled to first ring 224 on first ring second surface 274;
third seal 220 coupled to second ferrule 204;
second ring 226 comprising second ring first surface 272 and second ring second surface 276, wherein third seal 220 is coupled to second ring 226 on second ring first surface 272;
fourth seal 222 coupled to second ring 226 on second ring second surface 76; and
sleeve 230 coupled to second seal 218 and fourth seal 222, wherein second seal 218 is disposed between first ring 224 and sleeve 230, and wherein fourth seal 222 is disposed between second ring 226 and sleeve 230.

Clause 2. Aircraft refueling tube system 200 of clause 1, wherein first seal 216 and second seal 218 are disposed over first ferrule first portion 280 of first ferrule 202, and wherein third seal 220 and fourth seal 222 are disposed over second ferrule first portion 282 of second ferrule 204.

Clause 3. Aircraft refueling tube system 200 of any one of clause 1-2, wherein first seal 216 allows for first gap 250, at rest, between first ferrule 202 and first ring 224, and wherein second seal 218 allows for second gap 252, at rest, between first ring 224 and sleeve 230.

Clause 4. Aircraft refueling tube system 200 of any one of clauses 1-3, wherein tube interface 206 is configured to prevent leakage of first fluid 290 flowing through first ferrule 202 and second ferrule 204 when first ferrule 202 and second ferrule 204 are angularly misaligned.

Clause 5. Aircraft refueling tube system 200 of any one of clauses 1-4, wherein tube interface 206 is configured to allow angular misalignment between first ferrule 202 second ferrule 204 of up to threshold angle 212, and wherein sum of a first misalignment angle between first ferrule 202 and first ring 224 and a second misalignment angle between first ring 224 and sleeve 230 equals threshold angle 212.

Clause 6. Aircraft refueling tube system 200 of any one of clauses 1-5, wherein tube interface 206 further comprises:

collar 236 disposed over sleeve 230, collar 236 comprising a first portion, a second portion, and a third portion, wherein the second portion and the third portion are disposed at an angle to the first portion.

Clause 7. Aircraft refueling tube system 200 of clause 6, wherein tube interface 206 further comprises:

first side seal 240 disposed between first ring 224 and the second portion; and second side seal 242 disposed between second ring 226 and the third portion.

Clause 8. Aircraft refueling tube system 200 of any one of clauses 6-7, further comprising:

clip 232 disposed over collar 236 and configured to hold tube interface 206 to first ferrule 202 and second ferrule 204.

Clause 9. Aircraft refueling tube system 200 of any one of clauses 1-8, wherein first ferrule 202 comprises first groove 260, wherein second ferrule 204 comprises second groove 262, wherein first seal 216 is disposed within first groove 260, and wherein third seal 220 is disposed within second groove 262.

Clause 10. Aircraft refueling tube system 200 of clause 9, wherein first ring 224 comprises third groove 264, wherein second ring 226 comprises fourth groove 266, wherein second seal 218 is disposed within third groove 264, and wherein fourth seal 222 is disposed within fourth groove 266.

Clause 11. Aircraft refueling tube system 200 of any one of clause 1-10, wherein first seal 216, second seal 218, third seal 220, and fourth seal 222 are O-ring seals.

Clause 12. Aircraft refueling tube system 200 of any one of clauses 1-11, wherein first refueling tube 302 comprises first inner flow channel 310 and first outer flow channel 312, wherein second refueling tube 304 comprises second inner flow channel 318 and second outer flow channel 316, wherein first inner flow channel 310 and second inner flow channel 318 are configured to flow first fluid 290 therebetween, wherein first outer flow channel 312 and second outer flow channel 316 are configured to flow second fluid 292 therebetween, and wherein tube interface 206 is configured to prevent leakage of first fluid 290 into first outer flow channel 312 and/or second outer flow channel 316 and prevent leakage of second fluid 292 into first inner flow channel 310 and/or second inner flow channel 318.

Clause 13. Aircraft refueling tube system 200 of clause 12, wherein first ferrule 202 comprises first ferrule channel 320 and second ferrule channel 322, wherein second ferrule 204 comprises third ferrule channel 324 and fourth ferrule channel 326, wherein first ferrule channel 320 and third ferrule channel 324 are fluidically coupled to first inner flow channel 310 and second inner flow channel 318, and wherein second ferrule channel 322 and fourth ferrule channel 326 are fluidically coupled to first outer flow channel 312 and second outer flow channel 316.

Clause 14, Aircraft refueling tube system 200 of any one of clauses 1-13, wherein first ferrule 202 comprises first ferrule first portion 280 and first ferrule second portion 284 thicker than first ferrule first portion 280, wherein second ferrule 204 comprises second ferrule first portion 282 and second ferrule second portion 286 thicker than second ferrule first portion 282, wherein first seal 216 is connected to first ferrule first portion 280, and wherein third seal 220 is connected to second ferrule first portion 282.

Clause 15, Aircraft refueling tube system 200 of clause 14, further comprising:

outer cover 234 coupled to first ferrule first portion 280 via first outer seal 244 and coupled to second ferrule first portion 282 via second outer seal 246, wherein outer cover 234 is disposed outward of tube interface 206.

Clause 16. Aircraft refueling tube interface 206 comprising:

first seal 216 configured to couple to first ferrule 202;

first ring 224 comprising first ring first surface 270 and first ring second surface 274, wherein first seal 216 is coupled to first ring 224 on first ring first surface 270;

second seal 218 coupled to first ring 224 on first ring second surface 274;

third seal 220 configured to couple to second ferrule 204;

second ring 226 comprising second ring first surface 272 and second ring second surface 276, wherein third seal 220 is coupled to second ring 226 on second ring first surface 272;

fourth seal 222 coupled to second ring 226 on second ring second surface 276; and sleeve 230 coupled to second seal 218 and fourth seal 222, wherein second seal 218 is disposed between first ring 224 and sleeve 230, and wherein fourth seal 222 is disposed between second ring 226 and sleeve 230.

Clause 17. Aircraft refueling tube interface 206 of clause 16, further comprising:

collar 236 disposed over sleeve 230, collar 236 comprising a first portion, a second portion, and a third portion, wherein the second portion and the third portion are disposed at an angle to the first portion.

Clause 18. Aircraft refueling tube interface 206 of clause 17, further comprising:

first side seal 240 disposed between first ring 224 and the second portion; and second side seal 242 disposed between second ring 226 and the third portion.

Clause 19. Aircraft refueling tube interface 206 of any one of clauses 16-18, wherein first ring 224 comprises first groove 260, wherein second ring 226 comprises second groove 262, wherein second seal 218 is disposed within first groove 260, and wherein fourth seal 222 is disposed within second groove 262.

Clause 20. Aircraft refueling tube interface 206 of any one of clauses 16-19, wherein first seal 216, second seal 218, third seal 220, and fourth seal 222 are O-ring seals.

Clause 21. Method 500 comprising:

coupling (step 504) first seal 216 to first ferrule 202;

coupling (step 512) third seal 220 to second ferrule 204;

disposing (step 506) first ring 224 around first seal 216;

disposing (step 514) second ring 226 around third seal 220;

disposing (step 508) second seal 218 around first ring 224;

disposing (step 516) fourth seal 222 around second ring 226; and coupling (step 520) sleeve 230 to second seal 218 and fourth seal 222.

Clause 22. Method 500 of clause 21, further comprising:
disposing (step 522) collar 236 around sleeve 230; and
disposing (step 524) clip 232 around collar 236.

CONCLUSION

Although foregoing concepts have been described in some detail for purposes of clarity of understanding, it will be apparent that certain changes and modifications may be practiced within scope of appended claims. It should be noted that there are many alternative ways of implementing processes, systems, and apparatuses. Accordingly, present examples are to be considered as illustrative and not restrictive.

The invention claimed is:

1. An aircraft refueling tube system (200) comprising:
a first refueling tube;
a second refueling tube;
a first ferrule coupled to the first refueling tube;
a second ferrule coupled to the second refueling tube; and
a tube interface comprising:
 a first seal coupled to the first ferrule;
 a first ring comprising a first ring first surface and a first ring second surface, wherein the first seal is coupled to the first ring on the first ring first surface;
 a second seal coupled to the first ring on the first ring second surface;
 a third seal coupled to the second ferrule;
 a second ring comprising a second ring first surface and a second ring second surface, wherein the third seal is coupled to the second ring on the second ring first surface;
 a fourth seal coupled to the second ring on the second ring second surface; and
 a sleeve coupled to the second seal and the fourth seal, wherein the second seal is disposed between the first ring and the sleeve, and wherein the fourth seal is disposed between the second ring and the sleeve.

2. The aircraft refueling tube system of claim 1, wherein the first seal and the second seal are disposed over a first ferrule first portion of the first ferrule, and wherein the third seal and the fourth seal are disposed over a second ferrule first portion of the second ferrule.

3. The aircraft refueling tube system of claim 1, wherein the first seal allows for a first gap, at rest, between the first ferrule and the first ring, and wherein the second seal allows for a second gap, at rest, between the first ring and the sleeve.

4. The aircraft refueling tube system of claim 1, wherein the tube interface is configured to prevent leakage of a first fluid flowing through the first ferrule and the second ferrule when the first ferrule and the second ferrule are angularly misaligned.

5. The aircraft refueling tube system of claim 4, wherein the tube interface is configured to allow angular misalignment between the first ferrule the second ferrule of up to a threshold angle, and wherein sum of a first misalignment angle between the first ferrule and the first ring and a second misalignment angle between the first ring and the sleeve equals the threshold angle.

6. The aircraft refueling tube system of claim 1, wherein the tube interface further comprises:
a collar disposed over the sleeve, the collar comprising a first portion, a second portion, and a third portion, wherein the second portion and the third portion are disposed at an angle to the first portion.

7. The aircraft refueling tube system of claim 6, wherein the tube interface further comprises:
a first side seal disposed between the first ring and the second portion; and
a second side seal disposed between the second ring and the third portion.

8. The aircraft refueling tube system of claim 6, further comprising:
a clip disposed over the collar and configured to hold the tube interface to the first ferrule and the second ferrule.

9. The aircraft refueling tube system of claim 1, wherein the first ferrule comprises a first groove, wherein the second ferrule comprises a second groove, wherein the first seal is disposed within the first groove, and wherein the third seal is disposed within the second groove.

10. The aircraft refueling tube system of claim 9, wherein the first ring comprises a third groove, wherein the second ring comprises a fourth groove, wherein the second seal is disposed within the third groove, and wherein the fourth seal is disposed within the fourth groove.

11. The aircraft refueling tube system of claim 1, wherein the first seal, the second seal, the third seal, and the fourth seal are O-ring seals.

12. The aircraft refueling tube system of claim 1, wherein the first refueling tube comprises a first inner flow channel and a first outer flow channel, wherein the second refueling tube comprises a second inner flow channel and a second outer flow channel, wherein the first inner flow channel and the second inner flow channel are configured to flow a first fluid therebetween, wherein the first outer flow channel and the second outer flow channel are configured to flow a second fluid therebetween, and wherein the tube interface is configured to prevent leakage of the first fluid into the first outer flow channel and/or the second outer flow channel and prevent leakage of the second fluid into the first inner flow channel and/or the second inner flow channel.

13. The aircraft refueling tube system of claim 12, wherein the first ferrule comprises a first ferrule channel and a second ferrule channel, wherein the second ferrule comprises a third ferrule channel and a fourth ferrule channel, wherein the first ferrule channel and the third ferrule channel are fluidically coupled to the first inner flow channel and the second inner flow channel, and wherein the second ferrule channel and the fourth ferrule channel are fluidically coupled to the first outer flow channel and the second outer flow channel.

14. The aircraft refueling tube system of claim 1, wherein the first ferrule comprises a first ferrule first portion and a first ferrule second portion larger than the first ferrule first portion, wherein the second ferrule comprises a second ferrule first portion and a second ferrule second portion larger than the second ferrule first portion, wherein the first seal is connected to the first ferrule first portion, and wherein the third seal is connected to the second ferrule first portion.

15. The aircraft refueling tube system of claim 14, further comprising:
an outer cover coupled to the first ferrule first portion via a first outer seal and coupled to the second ferrule first portion via a second outer seal, wherein the outer cover is disposed outward of the tube interface.

16. An aircraft tube interface comprising:
a first ferrule;
a first seal configured to couple to the first ferrule;
a first ring comprising a first ring first surface and a first ring second surface, wherein the first seal is coupled to the first ring on the first ring first surface, wherein the first seal is positioned between the first ring first surface and a portion of the first ferrule;
a second seal coupled to the first ring on the first ring second surface;
a second ferrule;
a third seal configured to couple to the second ferrule;
a second ring comprising a second ring first surface and a second ring second surface, wherein the third seal is coupled to the second ring on the second ring first surface, wherein the second seal is positioned between the second ring first surface and a portion of the second ferrule;
a fourth seal coupled to the second ring on the second ring second surface; and
a sleeve coupled to the second seal and the fourth seal, wherein the second seal is disposed between the first ring and the sleeve, and wherein the fourth seal is disposed between the second ring and the sleeve.

17. The aircraft tube interface of claim 16, further comprising:
a collar disposed over the sleeve, the collar comprising a first portion, a second portion, and a third portion, wherein the second portion and the third portion are disposed at an angle to the first portion.

18. The aircraft tube interface of claim 17, further comprising:
a first side seal disposed between the first ring and the second portion; and
a second side seal disposed between the second ring and the third portion.

19. The aircraft tube interface of claim 16, wherein the first ring comprises a first groove, wherein the second ring comprises a second groove, wherein the second seal is disposed within the first groove, and wherein the fourth seal is disposed within the second groove.

20. The aircraft tube interface of claim 16, wherein the first seal, the second seal, the third seal, and the fourth seal are O-ring seals.

21. A method comprising:
coupling a first seal to a first ferrule;
coupling a third seal to a second ferrule;
disposing a first ring around the first seal, wherein the first ring comprises a first ring first surface and a first ring second surface, wherein the first seal is positioned between the first ring first surface and a portion of the first ferrule;
disposing a second ring around the third seal, wherein the second ring comprises a second ring first surface and a second ring second surface;
coupling the third seal to the second ring on the second ring first surface;
disposing a second seal around the first ring on the first ring second surface, wherein the second seal is positioned between the second ring first surface and a portion of the second ferrule;
disposing a fourth seal around the second ring; and
coupling a sleeve to the second seal and the fourth seal.

22. The method of claim 21, further comprising:
disposing a collar around the sleeve; and
disposing a clip around the collar.

* * * * *